United States Patent
Fulton et al.

(10) Patent No.: US 9,934,133 B1
(45) Date of Patent: Apr. 3, 2018

(54) CODE COVERAGE THROUGH OVERLAY HOOKS

(71) Applicant: International Business Machines Corporation, Armonk, NY (US)

(72) Inventors: Michael S. Fulton, Squamish (CA); Kevin A. Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/671,392

(22) Filed: Aug. 8, 2017

Related U.S. Application Data

(63) Continuation of application No. 15/268,670, filed on Sep. 19, 2016.

(51) Int. Cl.
G06F 9/44 (2006.01)
G06F 11/36 (2006.01)

(52) U.S. Cl.
CPC ...... G06F 11/3676 (2013.01); G06F 11/3624 (2013.01); G06F 11/3644 (2013.01)

(58) Field of Classification Search
CPC .................. G06F 11/3466; G06F 11/3636
USPC ................... 717/127, 128; 714/35
See application file for complete search history.

(56) References Cited

U.S. PATENT DOCUMENTS

| | | | | |
|---|---|---|---|---|
| 5,758,061 A | * | 5/1998 | Plum | G06F 11/3676 714/35 |
| 5,761,408 A | * | 6/1998 | Kolawa | G06F 11/3676 714/38.1 |
| 5,784,553 A | * | 7/1998 | Kolawa | G06F 11/3676 714/38.1 |
| 6,023,580 A | * | 2/2000 | Sifter | G06F 11/3672 714/E11.208 |
| 6,990,438 B1 | * | 1/2006 | Chowdhury | G06F 17/5022 703/13 |
| 7,861,226 B1 | | 12/2010 | Episkopos et al. | |
| 8,612,938 B2 | | 12/2013 | Prasad et al. | |
| 8,839,203 B2 | | 9/2014 | Opstad et al. | |
| 8,898,647 B2 | | 11/2014 | Sobolev et al. | |
| 8,914,879 B2 | | 12/2014 | Melnik et al. | |
| 2005/0081104 A1 | * | 4/2005 | Nikolik | G06F 11/3688 714/38.13 |
| 2006/0253739 A1 | * | 11/2006 | Godefroid | G06F 11/3688 714/38.13 |
| 2010/0175052 A1 | * | 7/2010 | Prasad | G06F 11/3612 717/128 |
| 2012/0304010 A1 | | 11/2012 | Opstad et al. | |

(Continued)

OTHER PUBLICATIONS

Kim, "Efficient Use of Code Coverage in Large-Scale Software Development", 2003.*

(Continued)

*Primary Examiner* — Phillip H Nguyen
(74) *Attorney, Agent, or Firm* — Stephanie L. Carusillo

(57) ABSTRACT

In an approach for utilizing overlay hooks to increase code coverage, a processor inserts an overlay hook in program code at a location within the program code corresponding to a condition statement. A processor executes the program code. Upon reaching the overlay hook, a processor branches to a set of instructions operative to document an outcome of the condition statement. A processor executes the condition statement. A processor records the outcome of the condition statement.

1 Claim, 3 Drawing Sheets

(56) References Cited

U.S. PATENT DOCUMENTS

2013/0232473 A1  9/2013  Braun et al.
2016/0321586 A1* 11/2016  Herzig ............. G06Q 10/06313

OTHER PUBLICATIONS

Siloju, "SDBC: Sandbox-based Dynamic Branch Coverage Expansion for Detecting Atomicity Violations", 2010.*
Shahid et al., "An Evaluation of Test Coverage Tools in Software Testing", 2011.*
Fu et al., "Compiler-directed Program-fault Coverage for Highly Available Java Internet Services", 2003.*
Ding et al., "Detecting Infeasible Branches Based on Code Patterns", CSMR-WCRE 2014, Antwerp, Belgium, © 2014 IEEE, pp. 74-83.
Hassan et al., "Comparing Multi-point Stride Coverage and Dataflow Coverage", ICSE 2013, San Francisco, CA, USA, © 2013 IEEE, pp. 172-181.
Seitz, Justin, 'Debugger Hooks', in Gray Hat Python, Chapter 11, section 11.2.5, pp. 157-158, No Starch Press, Inc., San Francisco, CA, Copyright © 2009 by Justin Seitz.
Whalen et al., "Observable Modified Condition/Decision Coverage", ICSE 2013, San Francisco, CA, USA, © 2013 IEEE, pp. 102-111.
"Code Coverage", From Wikipedia, the free encyclopedia, last modified on May 6, 2016, at 20:35, 6 pages, <https://en.wikipedia.org/wiki/Code_coverage>.
"CTC ++ for Java and C# add-on", Verifysoft Technology, last updated: Apr. 15, 2011, © 2007-2011 VerifySoft Technology GmbH, 4 pages, <http://www.verifysoft.com/en_ctc_java_csharp.html>.
"Method for Determining Code Coverage of an Application"; An IP.com Prior Art Database Technical Disclosure; IP.com No. IPCOM000217053D; IP.com Electronic Publication Date: Apr. 30, 2012. 3 Pages.
"nmcveity/lcovtools: Lua Code Coverage Tools", Github, Latest commit 2a3f3e0 on Dec. 16, 2010, 2 pages, <https://github.com/nmcveity/lcovtools>.
"Testwell CTC++ Test Coverage Analyser", Verifysoft Technology, Last Updated: Mar. 23, 2016, © 2015-2016 Verifysoft Technology GmbH, 3 pages, <http://www.verifysoft.com/en_ctcpp.html>.
Fulton et al., "Improving Code Coverage Through Overlay Hooks", U.S. Appl. No. 15/268,670, filed Sep. 19, 2016, 23 pages.
IBM List of IBM Patent Applications Treated As Related, Appendix P, dated Aug. 8, 2017, 2 pages.
IBM, List of IBM Patent Applications Treated As Related, Appendix P, Filed Herewith, 2 pages.
Fulton et al., "Improving Code Coverage Through Overlay Hooks", U.S. Appl. No. 15/268,670, filed Sep. 19, 2016.
Fulton et al., "Improving Code Coverage Through Overlay Hooks", U.S. Appl. No. 15/876,450, filed Jan. 22, 2018.
Fulton et al., "Improving Code Coverage Through Overlay Hooks", U.S. Appl. No. 15/876,487, filed Jan. 22, 2018.

* cited by examiner

CODE COVERAGE THROUGH OVERLAY HOOKS

BACKGROUND

The present invention relates generally to the field of code coverage, and more particularly to runtime-directed overlay hooks being used to track code coverage.

Code coverage is a measure used to describe the degree to which the program code of a program is tested by a particular test suite. A program with high code coverage has been more thoroughly tested and has a lower chance of containing software bugs than a program with low code coverage. To measure what percentage of code has been exercised by a test suite, one or more coverage criteria are used: function coverage, statement coverage, branch coverage, and condition coverage. Function coverage requires that each function in the program be called. Statement coverage requires each statement in the program to be executed. Branch coverage requires each branch of each control structure to be executed. Condition coverage requires each Boolean sub-expression to be evaluated both to true and false.

A combination of function coverage and branch coverage is sometimes also called decision coverage. This criterion requires that every point of entry and exit in the program have been invoked at least once, and every decision in the program have taken on all possible outcomes at least once. Modified condition/decision coverage (MC/DC) requires that both decision and condition coverage be satisfied and that each condition should affect the decision outcome independently.

SUMMARY

Aspects of an embodiment of the present invention disclose a method for utilizing overlay hooks to increase code coverage. A processor inserts an overlay hook in program code at a location within the program code corresponding to a condition statement. A processor executes the program code. Upon reaching the overlay hook, a processor branches to a set of instructions operative to document an outcome of the condition statement. A processor executes the condition statement. A processor records the outcome of the condition statement.

DETAILED DESCRIPTION

Embodiments of the present invention recognize the importance of achieving high code coverage when testing the program code of a program. Using modified condition/decision coverage (MC/DC), it is impossible to tell if a test is covering all the possible conditions for a section of code. For example, if a line of code reads—if (a<=b) then {b=5} else {b=1}, MC/DC code coverage will only show that a<=b and a>b were tested. However, it cannot be determined whether a<b or a=b caused the 'if' to execute for the a<=b instance. Thus, there is a need for a code coverage method that covers these edge conditions in testing. Embodiments of the present invention provide solutions for this inability to determine whether each condition has actually been tested. In this manner, as discussed in greater detail herein, embodiments of the present invention can provide finer-grained coverage of conditional paths through code by tracking all possible condition codes through the use of overlay hooks.

The present invention will now be described in detail with reference to the Figures.

Figure 1:
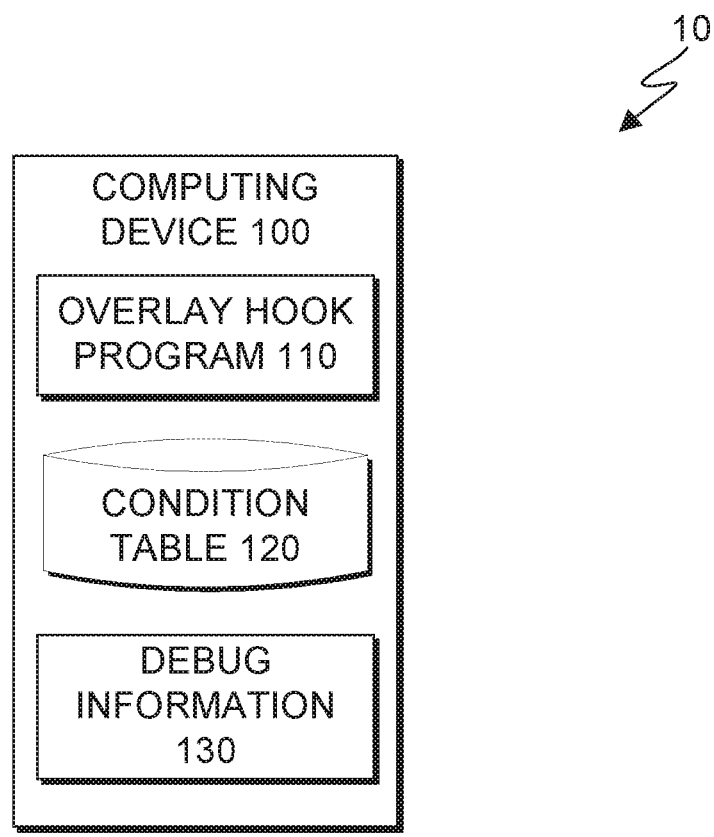
FIG. 1 is a functional block diagram illustrating a code testing environment, in accordance with an embodiment of the present invention.

FIG. 1 depicts a diagram of code testing environment 10, in accordance with an embodiment of the present invention. FIG. 1 provides only an illustration of one embodiment and does not imply any limitations with regard to the environments in which different embodiments may be implemented.

In the depicted embodiment, code testing environment 10 includes computing device 100. Code testing environment 10 may include additional computing devices, servers, computers, mobile devices, or other devices not shown. Computing device 100 may be a management server, a web server, laptop computer, tablet computer, netbook computer, personal computer (PC), a desktop computer, a smart phone, or any programmable electronic device or computing system capable of running a program and receiving and sending data. In other embodiments, computing device 100 may represent a server computing system utilizing multiple computers as a server system, such as in a cloud computing environment. In the depicted embodiment, computing device 100 contains overlay hook program 110, condition table 120, and debug information 130. Computing device 100 may include components, as depicted and described in further detail with respect to FIG. 3.

Overlay hook program 110 operates as a runtime debugger that executes overlay hooks inserted in the program code to track code coverage by recording each condition outcome as the condition outcome is set. An overlay hook is a segment of code that places a hook into a program to transfer control to a debugger and overlays the current instruction with a new instruction. When inserting an overlay hook, overlay hook program 110 creates a location that can be branched to, and at that location, overlay hook program 110 saves the condition statement that is overlaid by the overlay hook. The overlay hook lines of code are inserted directly on top of where the condition statement was in the program code. For example, overlay hook program 110 would replace a condition statement instruction "Compare A & B" with "Branch to comparison test," which is the overlay hook. The "comparison test" has instructions to execute the condition, record the condition outcome, check if all condition outcomes have been recorded, and return to the program code to continue executing. It should be appreciated that the actual overlay hook sequence will vary by operating system, compiled language, hardware instruction set, and assembler.

Generally, overlay hook program 110 runs alongside a debugger executing the program code. When the debugger begins executing the program code, overlay hook program 110 initiates running alongside the debugger. When an overlay hook is reached in the program code, overlay hook program 110 executes the overlay hook in the program code. Overlay hook program 110 determines whether to remove the overlay hook by checking condition table 120 to see if each possible condition outcome has executed. If each possible condition outcome has executed, overlay hook program 110 removes the overlay hook, reinserts the original condition statement, and continues executing the program code. If each possible condition outcome has not executed, overlay hook program 110 leaves the overlay hook within the program code and continues executing the program code. When the program code has been executed completely, overlay hook program 110 generates a report from condition table 120. Overlay hook program 110 has access to condition table 120 and updates condition table 120 with table entries of the location and outcome of a condition statement. In the depicted embodiment, overlay hook program 110 resides on computing device 100. In another embodiment, overlay hook program 110 may reside elsewhere within code testing environment 10 provided overlay hook program 110 has access to debug information 130 and condition table 120. Overlay hook program 110 is described in further detail with respect to FIG. 2.

Condition table 120 is updated by overlay hook program 110 with table entries of each possible condition outcome from a condition statement in program code as each possible condition outcome is set. Condition table 120 is a mapping table in which each entry includes a map to the location of the condition statement in the program code and the state of the condition once set. The state of the condition is the condition code register, or its equivalent depending on the instruction set architecture (ISA), such as high, low, less than or equal to, less than, equal to, greater than, greater than or equal to, etc. In the depicted embodiment, condition table 120 resides on computing device 100. In another embodiment, condition table 120 may reside elsewhere within code testing environment 10 provided overlay hook program 110 has access to condition table 120.

Debug information 130 is used by overlay hook program 110 to locate where conditions are in the program code allowing overlay hook program 110 to insert an overlay hook at each condition. Debug information 130 is generated as an object file when compiling code with a static compiler. Debug information 130 includes side information associated with the program code that gives mapping information from actual individual instructions back to the program code. For example, "instruction A" was generated to support the original source level statement on line 57 of "source file X." In the depicted embodiment, debug information 130 resides on computing device 100. In another embodiment, debug information 130 may reside elsewhere within code testing environment 10 provided overlay hook program 110 has access to debug information 130.

Figure 2:
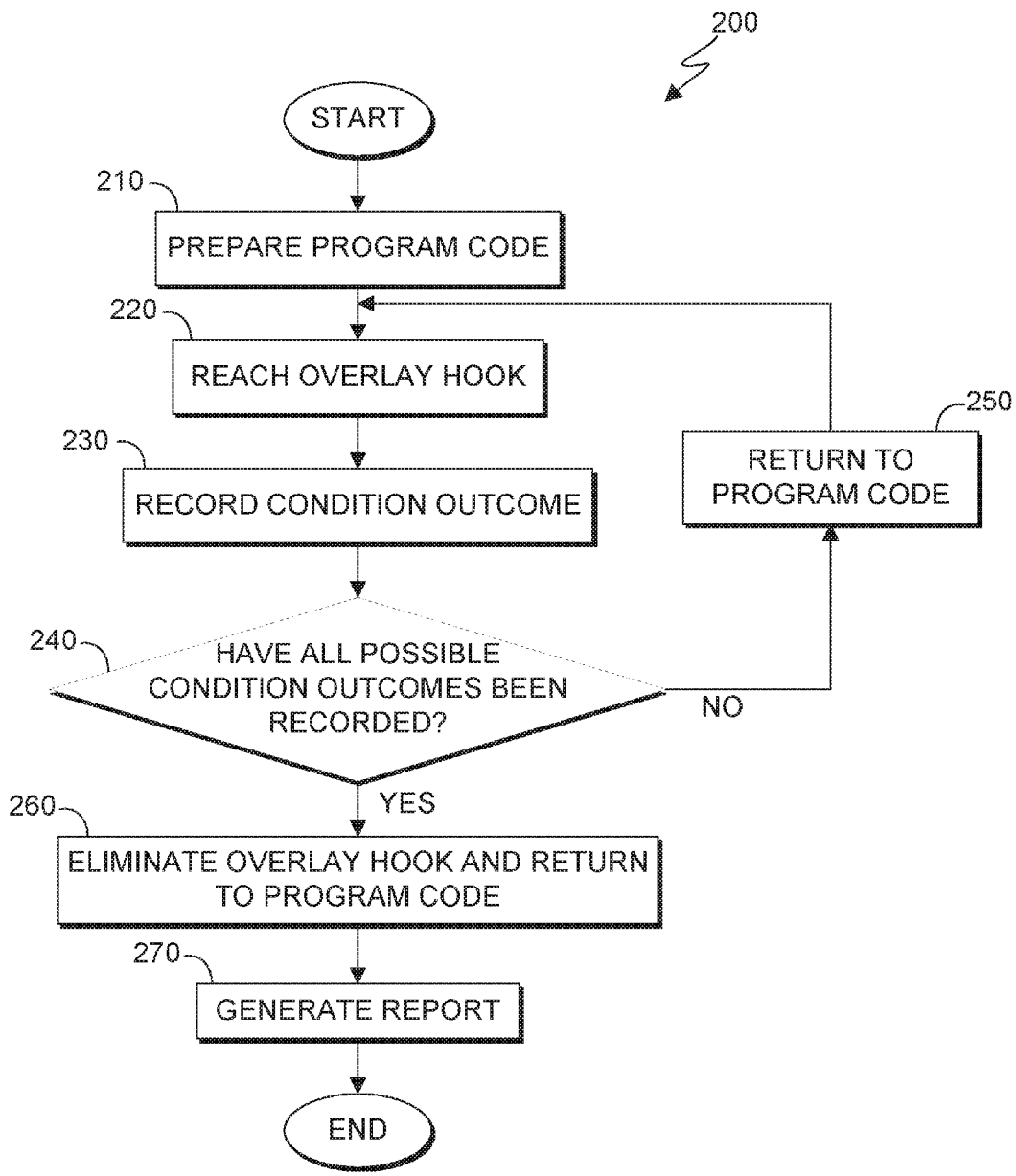
FIG. 2 is a flowchart depicting operational steps of an overlay hook program, on a computing device within the environment of FIG. 1, in accordance with an embodiment of the present invention.

FIG. 2 depicts flowchart 200 of the steps of overlay hook program 110, executing within code testing environment 10 of FIG. 1, in accordance with an embodiment of the present invention. Overlay hook program 110 prepares a program code and then executes inserted overlay hooks until each possible condition outcome has executed.

In step 210, overlay hook program 110 prepares the program code. Before the program code is executed, overlay hook program 110 prepares the program code as described below according to different embodiments.

In a first embodiment, overlay hook program 110 analyzes debug information 130 to identify where condition statements are located in the program code and inserts an overlay hook at each condition statement.

In a second embodiment, overlay hook program 110 compiles the program code for use in MC/DC code coverage analysis. Overlay hook program 110 breaks apart branches to test only one possible condition outcome at a time. For example, the condition statement "if (a<=b) then {b=5} else {b=1}" would be broken apart to "if (a<b) then {b=5} else {b=1}" and "if (a=b) then {b=5} else {b=1}." These broken apart branches create simple condition statements in which each condition statement in the program code only has one possible condition outcome, i.e., one condition in a condition code register. Overlay hook program 110 analyzes debug information 130 for where condition statements are in the program code. Overlay hook program 110 inserts a simple overlay hook at each simple condition statement that includes instructions to update condition table 120 with the condition statement's location when the condition statement executes. When an overlay hook is reached in the program code, overlay hook program 110 executes the overlay hook in the program code, which involves overlay hook program 110 recording the location of the condition statement in condition table 120. Overlay hook program 110 removes the overlay hook and continues executing the program code. When the program code has been executed completely, overlay hook program 110 generates a report from condition table 120.

In a third embodiment, overlay hook program 110 is a combination of the first and second embodiments. Overlay hook program 110 analyzes debug information 130 for where condition statements are in the program code. Overlay hook program 110 inserts a simple overlay hook for a simple condition statement or inserts a complex overlay hook for a complex condition statement. A simple condition statement only has one possible condition outcome, i.e. one condition in a condition code register. A complex condition statement has multiple possible outcomes, i.e. multiple possible conditions in a condition code register and perhaps multiple condition code registers, if the instruction set architecture supports multiple condition code registers. A simple overlay hook records its location in condition table 120 and then the simple overlay hook is eliminated. A complex overlay hook operates the same as an overlay hook described in the paragraphs describing overlay hook program 110 above.

In step 220, overlay hook program 110 reaches an overlay hook. In an embodiment, overlay hook program 110 runs alongside a debugger executing the program code. When the debugger begins executing the program code, overlay hook program 110 initiates running alongside the debugger. In an embodiment, overlay hook program 110 runs alongside the debugger and reaches an overlay hook in the program code and executes the overlay hook.

In step 230, overlay hook program 110 records a condition outcome. In the first embodiment, once the condition statement has executed, overlay hook program 110 records the outcome of the condition and the location of the condition as table entries in condition table 120. In the second embodiment, once the simple condition statement has executed, overlay hook program 110 records the location of the condition as a table entry in condition table 120. In the third embodiment, for a complex condition statement that is executed, overlay hook program 110 records the outcome of the condition and the location of the condition as table entries in condition table 120. In the third embodiment, for a simple condition statement that is executed, overlay hook program 110 records the location of the condition as a table entry in condition table 120.

In decision 240, overlay hook program 110 determines whether each possible condition outcome has been recorded. For example, if a condition statement is "less than or equal to," the condition statement has multiple possible outcomes. Overlay hook program 110 cross-references with condition table 120 to determine if all the possible condition outcomes have been recorded. If overlay hook program 110 determines that all the possible condition outcomes have been recorded (decision 240, yes branch), then overlay hook program 110 eliminates the overlay hook and continues executing the program code (see step 260). If overlay hook program 110 determines that not all the possible condition outcomes have been recorded (decision 240, no branch), then overlay hook program 110 returns to the program code (see step 250).

In step 250, overlay hook program 110 continues executing the program code. In an embodiment, overlay hook program 110 determines that not all the possible condition outcomes have been recorded, therefore overlay hook program 110 keeps the overlay hook at the condition statement and continues executing the program code after the overlay hook.

In step 260, overlay hook program 110 removes the overlay hook and continues executing the program code. In an embodiment, overlay hook program 110 determines that all the possible condition outcomes have been recorded, therefore, overlay hook program 110 removes the overlay hook from the condition statement and continues executing the program code after the overlay hook.

In step 270, overlay hook program 110 generates a report. In an embodiment, overlay hook program 110 generates a report of the condition states and condition statement locations recorded in condition table 120.

Figure 3:
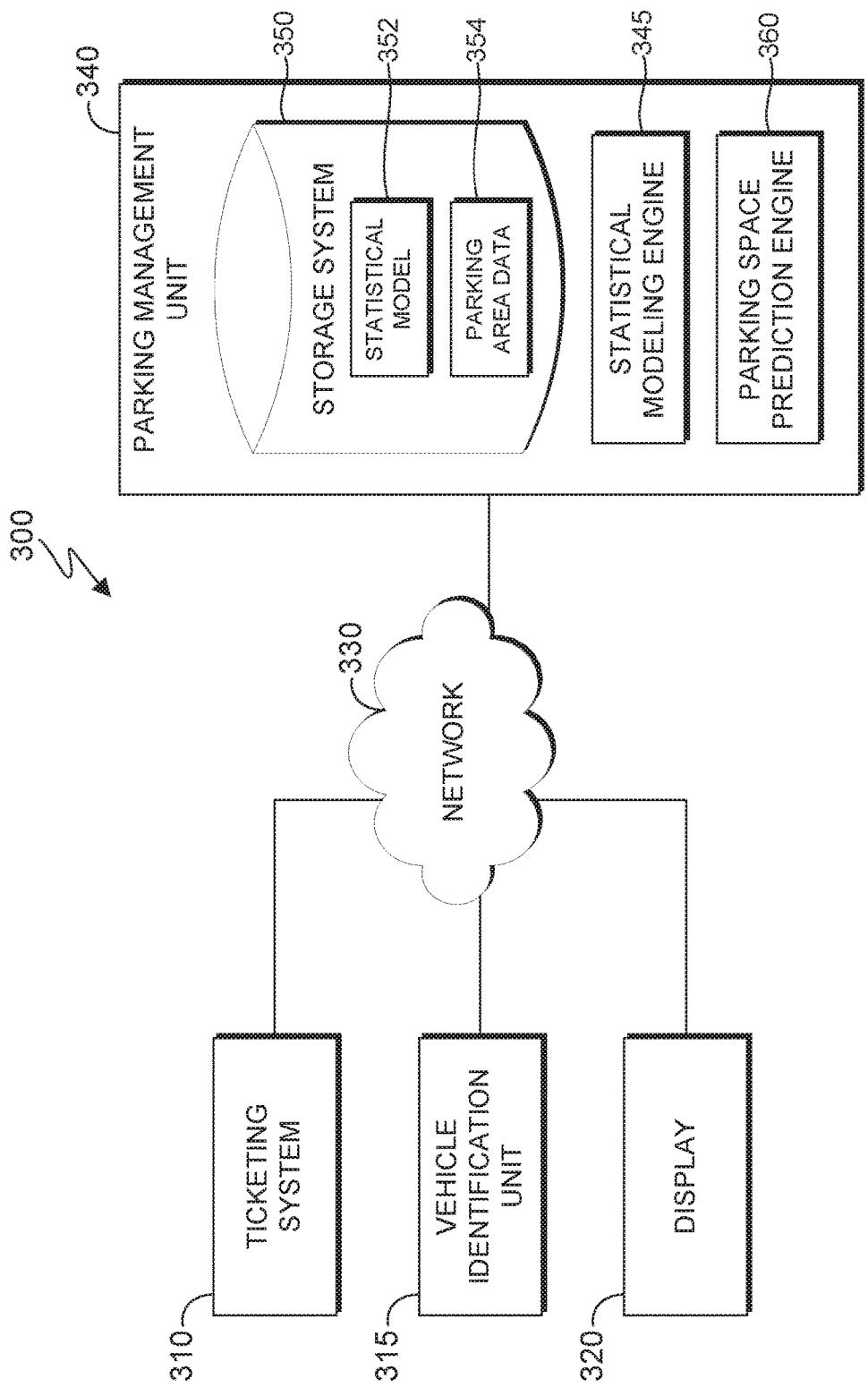
FIG. 3 depicts a block diagram of components of the computing device executing the overlay hook program, in accordance with an embodiment of the present invention.

FIG. 3 is a block diagram depicting components of a computer 300 suitable for executing the overlay hook program 110. FIG. 3 displays the computer 300, the one or more processor(s) 304 (including one or more computer processors), the communications fabric 302, the memory 306, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g. microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for overlay hook program 110 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. Overlay hook program 110 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for utilizing overlay hooks to increase code coverage, the method comprising:
   compiling, by one or more processors, a program code with branches broken apart to test only one possible condition state at each condition statement;
   analyzing, by one or more processors, debug information to identify a location within the program code corresponding to a condition statement;
   exchanging, by one or more processors, the condition statement for an overlay hook at the location within the program code;
   executing, by one or more processors, the program code;
   upon reaching the overlay hook, branching, by one or more processors, to a set of instructions operative to document an outcome state of the condition statement, wherein the outcome state of the condition statement is selected from the group consisting of true, false, less than, equal to, and greater than;
   executing, by one or more processors, the condition statement;
   recording, by one or more processors, the outcome state of the condition statement and the location of the condition statement within the program code in a table;
   accessing, by one or more processors, the table;

determining, by one or more processors, whether each possible outcome state of the condition statement has been recorded in the table;

responsive to determining that each possible outcome state of the condition statement has not been recorded in the table, continuing to execute the program code;

responsive to determining that each possible outcome state of the condition statement has been recorded in the table, removing, by one or more processors, the overlay hook; and generating, by one or more processors, a report, wherein the report includes the recorded outcome state of the condition statement and the location within the program code corresponding to the condition statement.

\* \* \* \* \*